United States Patent [19]

Levosky et al.

[11] Patent Number: 4,762,358

[45] Date of Patent: Aug. 9, 1988

[54] AUTOMOTIVE SUN SCREEN

[75] Inventors: John M. Levosky, El Paso; Jack A. Dowdy, Canutillo; Carlos Herrera, El Paso, all of Tex.

[73] Assignee: J. Viola, Jr., El Paso, Tex.

[21] Appl. No.: 36,194

[22] Filed: Apr. 8, 1987

Related U.S. Application Data

[63] Continuation of Ser. No. 806,047, Dec. 6, 1985, abandoned.

[51] Int. Cl.$^4$ .............................................. B60J 3/02
[52] U.S. Cl. ................................. 296/97 G; 296/97 D; 160/323.1
[58] Field of Search ................ 296/97 R, 97 C, 97 G, 296/97 D; 160/323 R, 323 B

[56] References Cited

U.S. PATENT DOCUMENTS

| | | | |
|---|---|---|---|
| 2,322,934 | 6/1943 | Hicks | 160/238 |
| 2,557,005 | 6/1951 | McMullen | 160/323 R |
| 3,410,601 | 11/1963 | Thompson | 296/95 |
| 3,584,910 | 6/1971 | Lupul | 296/97 D |
| 3,880,461 | 4/1975 | Flanagan | 296/95 C |
| 4,057,287 | 11/1977 | Lilja | 296/97 K |
| 4,081,937 | 4/1978 | Koch | 296/97 R |
| 4,202,396 | 5/1980 | Levy | 296/97 R |
| 4,332,414 | 6/1982 | Surtin | 296/97 D |
| 4,358,488 | 11/1982 | Dunklin | 296/97 R |
| 4,363,513 | 12/1982 | Sahar | 296/97 J |
| 4,449,747 | 5/1984 | Morgan | 296/97 E |

FOREIGN PATENT DOCUMENTS 3206140   9/1983   Fed. Rep. of Germany .... 296/97 R Primary Examiner—Robert R. Song
Attorney, Agent, or Firm—Pravel, Gambrell, Hewitt, Kimball & Krieger

[57] ABSTRACT

A light weight vehicle sun screen is provided having a mounting system adaptable to curved windows of varying curvature. A pair of articulated mounting brackets are connected to substantially flat mounting plates thereby allowing the mounting plates to pivot until they are substantially aligned with the glass surface. The mounting plates can be secured to the glass directly or to the frame adjacent the glass via reticulated fasteners or the equivalent. The screen is biased toward a retracted position by a biasing assembly mounted substantially within a roller. A biasing spring straddles the shaft and is mounted to the frame with built-in windup so as to bias the screen toward the retracted position. The spring force can be overcome by drawing the screen down and securing the screen to a suitable retaining device.

18 Claims, 3 Drawing Sheets

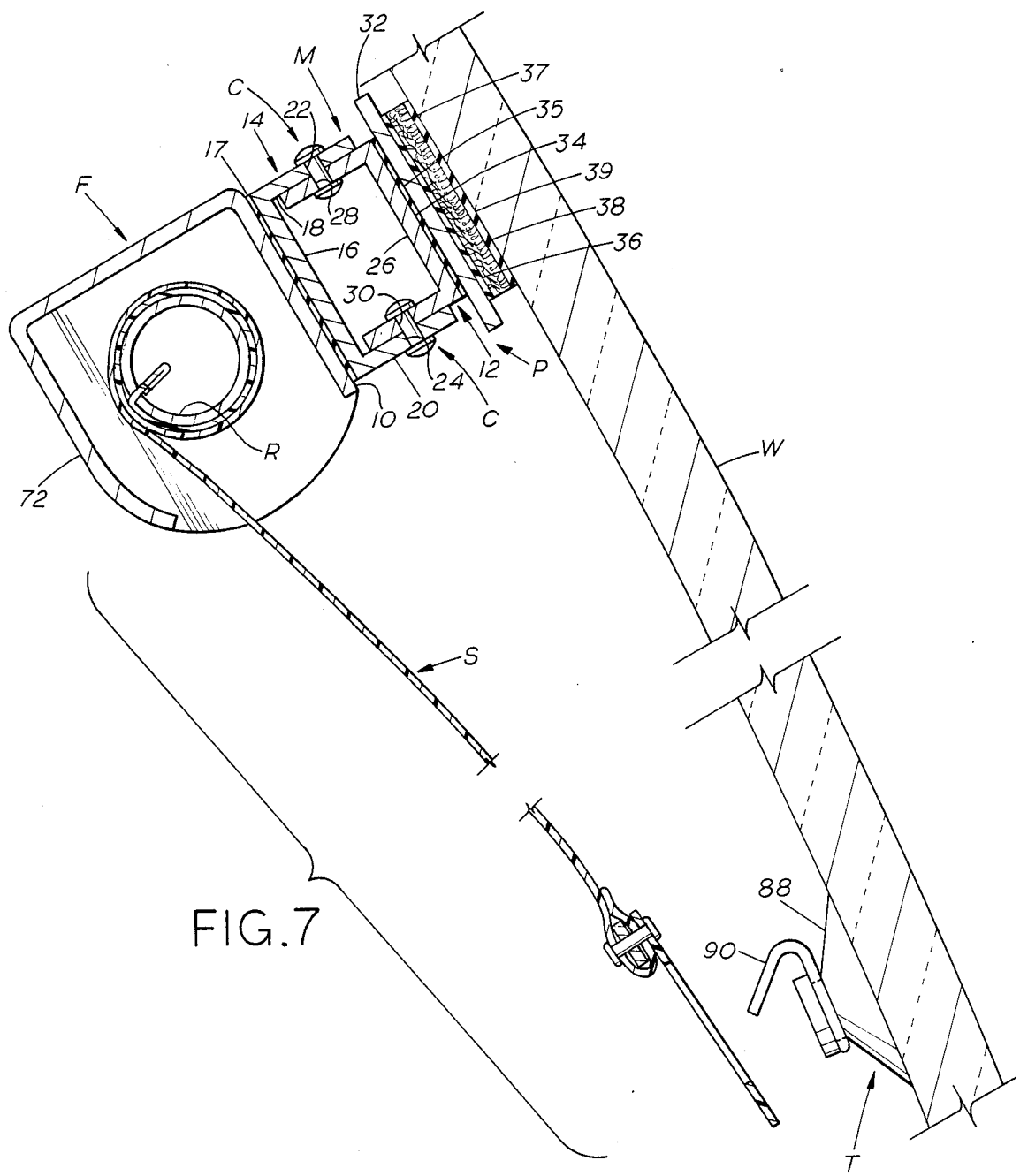
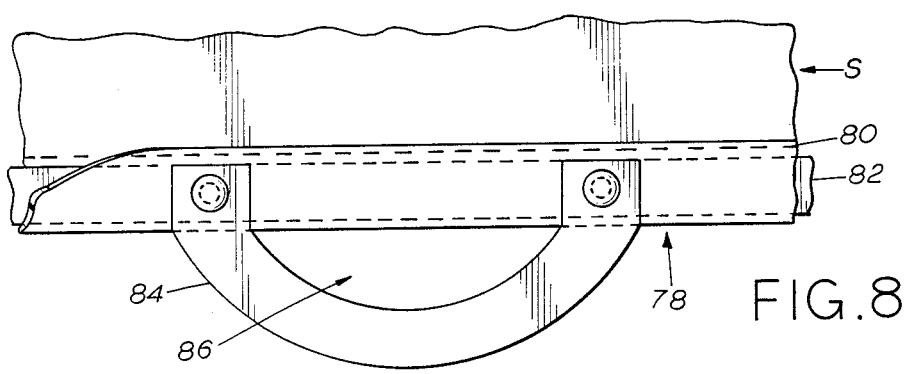

AUTOMOTIVE SUN SCREEN

This is a continuation of co-pending application Ser. No. 806,047, filed on Dec. 6, 1985, now abandoned.

FIELD OF THE INVENTION

The field of this invention relates to sun screens mounted in vehicle interiors to minimize heat infiltration from the sun.

BACKGROUND OF THE INVENTION

The various types of vehicle sun screens for different applications have been proposed in the past. Some sun screens, designed primarily for rear windows of vehicles, involved a plurality of fixed louvers disposed parallel to each other so as to obstruct the sun's rays while permitting rear visibiltiy for the driver. One such louvered screen design is illustrated in U.S. Pat. No. 4,469,366. Other types of fixed sun screens involved the use of opaque cloth panels mounted to a vehicle window on the interior and attached by suction cups. This type of screen is illustrated in U.S. Pat. No. 4,109,957. Other stationary type screens included those shown in U.S. Pat. No. 4,025,103 (screen material stretched over windshield or window on the outside of the vehicle); U.S. Pat. No. 4,261,649 (specially designed U-shaped brackets interacting with the windshield mounting in a vehicle to hold a stationary screen alongside the window).

Various types of retractable vehicle screens have been developed. Some have been attached by rigid fabricated steel brackets to the vehicle interior adjacent the window and have included a screen mounted on a roller. The screen was pulled down manually or motor actuated. One such device is disclosed in U.S. Pat. No. 4,497,515. Other screens, included clips adapted to engage a sun visor mounted above the driver or front seat passenger in combination with a screen and roller assembly. One such automotive sun screen is disclosed in U.S. Pat. No. 4,171,845. Still other sun screens provided reversible brackets to allow a roller mounted screen to be pulled downwardly to cover the window or allowed an alternative mounting of the roller adjacent the bottom of the window which required the screen to be pulled up to cover the window. Such devices were directed to substantially planar side windows of an automobile. Such a shade is described in detail in U.S. Pat. No. 4,179,155.

Various screens have been proposed to address the problem of mounting a frame to accommodate curvature of a vehicle window. The curvature in some vehicles being more pronounced than others, made it difficult in the past to provide a retractable screen to cover curved windows such as windshields in many different vehicles and yet be easily secured to the curved glass or curved frame adjacent its periphery. One proposed solution has been to employ a plurality of screens extending horizontally from the mid-point of the windshield and extending laterally to opposing edges adjacent the vehicle doors. Such a device employed a housing with spring bias tabs on one end which were designed to extend between the molding of the windshield and the glass, and a tab at the opposite end for extension between the glass of the windshield and the dashboard of the vehicle. Such screens, as disclosed in U.S. Pat. No. 4,442,881 had several drawbacks. For one, the housing which extended vertically in the middle of the windshield greatly reduced visibility through the windshield. Additionally, the horizontal extension of both screens was cumbersome for a driver to operate, especially the segment of the screen covering the passenger's side of the windshield.

The apparatus of the present invention addresses the problem of readily mounting a retractable screen assembly to a curved windshield or other window of the vehicle. The apparatus of the present invention is designed to be interchangeably used in any vehicle independent of the degree of curvature of the window to which it is mounted. A retractable screen is provided so that the assembly can be retained in the mounted position for further use without blocking the driver's field of vision while the vehicle is underway.

SUMMARY OF THE INVENTION

A vehicle sun screen is provided having a mounting system adaptable to curved windows of varying curvature. A pair of articulated mounting brackets are connected to substantially flat mounting plates thereby allowing the mounting plates to pivot until they are substantially aligned with the glass surface. The mounting plates can be secured to the glass directly or to the frame adjacent the glass via reticulated fasteners or the equivalent. The screen is biased toward a retracted position by a biasing assembly mounted substantially within a roller. A biasing spring straddles the shaft and is mounted to the frame with built-in windup so as to bias the screen toward the retracted position. The spring force can be overcome by drawing the screen down and securing the screen to a suitable retaining device.

BRIEF DESCRIPTION OF THE DRAWINGS

FIG. 7 is a sectional elevational view taken along lines 7—7 of FIG. 3;

FIG. 8 is a detailed view of the handle assembly on the screen.

DESCRIPTION OF THE PREFERRED EMBODIMENT

Figure 2:
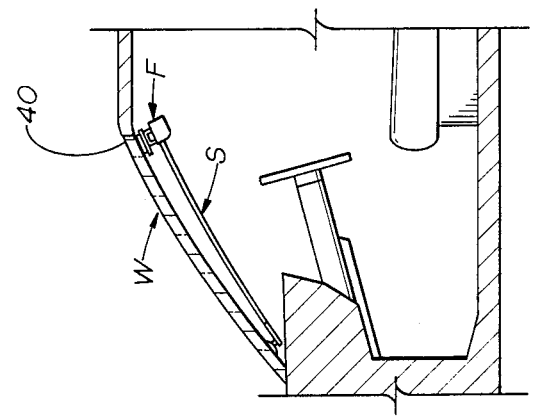
FIG. 2 is a sectional elevational view of the vehicle showing the apparatus of the present invention mounted to the windshield.
Figure 1:
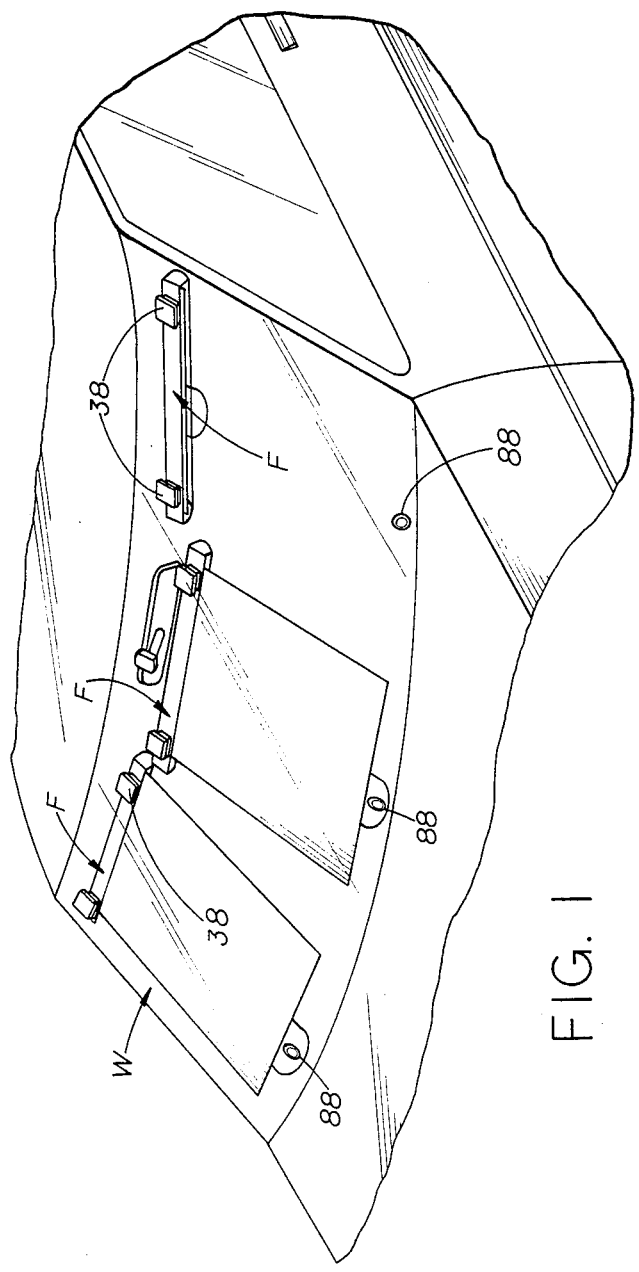
FIG. 1 is a perspective view of a vehicle showing the apparatus of the present invention mounted to the windshield.

Referring generally to the figures, the apparatus A is characterized by an elongated frame F, a roller R (FIGS. 4, 7), a screen S (FIG. 7), biasing means B (FIG. 4), mounting means M (FIG. 7) and retaining means T (FIG. 7).

Elongated frame F has a substantially flat mounting surface 10 thereon (FIG. 7). Mounting means M further comprises an inner bracket 12 and an outer bracket 14. Outer bracket 14 is essentially C-shaped having a substantially planar elongated segment 16. A first pivot segment 18 is attached at one end of segment 16. First pivot segment 18 is substantially planar and is disposed in a plane perpendicular to the plane of segment 16. Second pivot segment 20 is connected to the opposite end of segment 16 and disposed in a plane parallel to first pivot segment 18. Both first pivot segment 18 and second pivot segment 20 have a bore 22 and 24, respectively. Bores 22 and 24 are preferably disposed on aligned centers. Outer bracket 14 is secured to flat mounting surface 10 along segment 16 by an adhesive 17 or equivalent connection.

Inner bracket 12 is substantially C-shaped and has the identical details as outer bracket 14 with the exception that the planar elongated segment 26 is preferably shorter than planar elongated segment 16. Aligned bores 28 and 30 on said inner bracket 12 are in turn aligned with bores 22 and 24 when the inner bracket 12 is nested within outer bracket 14. As a result of the nesting of brackets 12 and 14, thereby aligning bores 12 and 28 as well as 24 and 30. Mounting means M includes pivot means P which comprises brackets 12 and 14 and fastening means C which can be one of any of several known fasteners such as pins or rivets. Fastening means C retains inner bracket 12 to outer bracket 14 in a pivotal relationship.

Mounting means M further comprises a mounting member 32. Mounting member 32 is substantially a flat plate. As shown in FIG. 7, mounting member 32 is secured to surface 34 of planar elongated segment 26 of inner bracket 12 by adhesive 35 or equivalent. Alternatively, mounting member 32 can be made integral with inner bracket 12.

Figure 3:
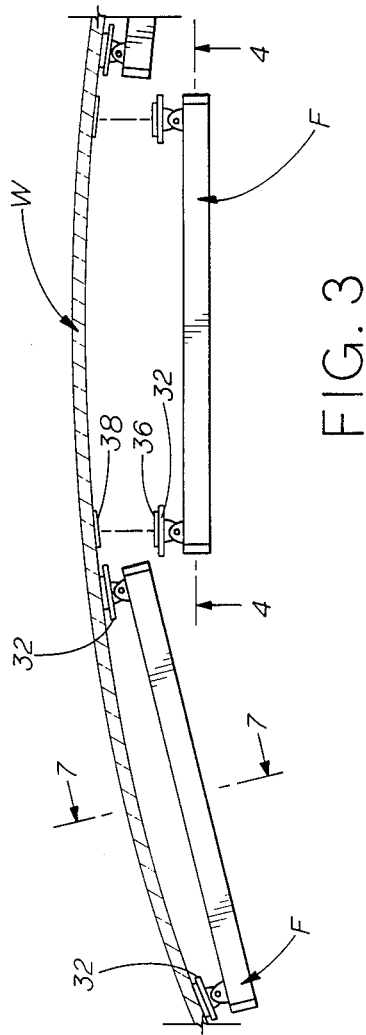
FIG. 3 is a plan view of the apparatus of the present invention looking down along the windshield of a vehicle.

A reticulated fastener 36 such as that presently marketed under the trademark VELCRO®, is attached to the mounting member 32 on a face opposite the face where inner bracket 12 is secured by adhesive 37 or equivalent. In the preferred embodiment, pairs of inners brackets 12 and outer brackets 14 are employed in conjunction with two mounting members 32, with each set disposed adjacent one end of elongated frame F (FIG. 3). A reticulated fastener 38 is preferably connected to the vehicle window W or may be alternatively connected to the frame 40 surrounding the window (FIG. 2) by adhesive 39 or equivalent (FIG. 7). Each reticulated fastener 38 preferably attached to the vehicle window W is designed to interact with a reticulated fastener 36 connected to a mounting member 32 to support frame F in two places. By using reticulated fasteners, the elongated frame can be easily removed from one vehicle and mounted in another vehicle. Those skilled in the art will appreciate that other quick connect devices can be used to secure mounting member 32 to the window W or the surrounding frame 40 without departing from the spirit of the invention.

As a result of the above-described structure, elongated frame F can be mounted in different vehicles each having windows of differing curvature. Essentially, through the interaction of inner bracket 12 and outer bracket 14 via pivot means P, mounting member 32 is disposed to pivot along an axis perpendicular to the longitudinal axis of elongated frame F. As a result, each mounting member 32 can be pivoted to be brought into close proximity with the window W for mounting thereon. Although a vehicle window such as a windshield is designed with a certain amount of curvature, by use of relatively small mounting members such as a polygonal shape having approximately three square inches, a substantially flat mounting member 32 can be disposed adjacent the glass and make contact, along substantially its entire length, with the window W through the interaction of reticulated fasteners 36 and 38.

Screen S is secured to roller R and is adapted for a movement from a retracted position (FIG. 4) wherein screen S is contained substantially within elongated frame F and an extended position (FIG. 7), wherein screen S covers the window. Biasing means B assists in retaining screen S in the retracted position.

Figure 4:
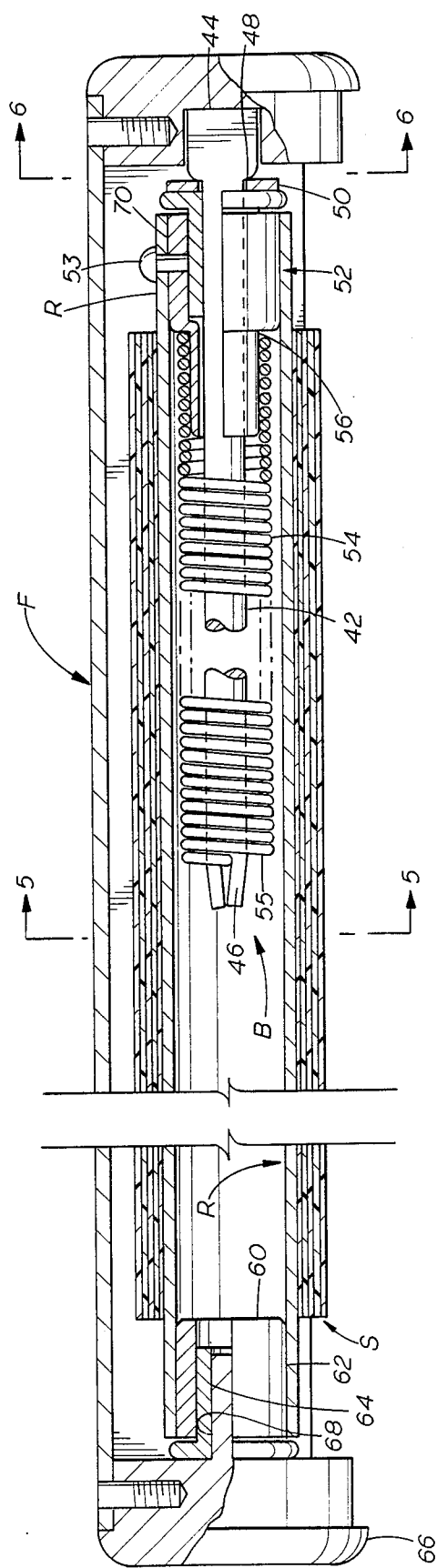
FIG. 4 is a sectional elevational view of the biasing means, roller, and screen assembly.

As seen in FIG. 4, biasing means B comprises a round shaft 42 having a plate 44 at one end and a longitudinal slot 46 at the opposite end. Flat 44 has a larger width than the diameter of shaft 42 thereby defining a mounting surface 48 therebetween. In the preferred embodiment, a washer 50 is slipped over shaft 42 until it contacts mounting surface 48. A bearing 52 is slipped over shaft 42 from the end having a longitudinal slot 46 until it contacts washer 50. Bearing 52 is secured to roller R via a set screw 53 or equivalent attachment means. In the preferred embodiment, a coil spring 54 is slipped over shaft 42. Bearing 52 has a reduced diameter section 56. One end of spring 54 is adapted to be mounted over the outer surface of reduced diameter section 56 in order to prevent relative movement therebetween via a force fit. Those skilled in the art will appreciate that spring 54 can be secured to bearing 52 in several other equivalent ways without departing from the spirit of the invention. The opposite end 55 of spring 54 is secured within slot 46 whereupon slot 46 is thereafter crimped to prevent disengagement of spring 54.

Figure 5:
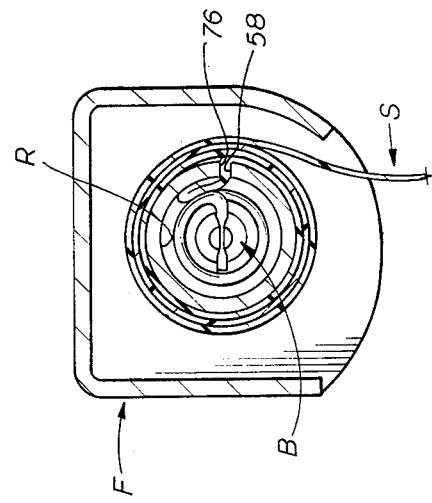
FIG. 5 is a sectional elevational view taken along lines 5—5 of FIG. 4.

Roller R is a tubular member having a longitudinal slit 58 thereon (FIG. 5). Slit 58 relates to securement of screen S as will be more fully described hereinbelow. In assembling the roller R to the elongated frame F, a second bearing 60 is inserted into one end of roller R. The bearing 60 is essentially of a cylindrical shape having an outer surface 62 that is of a diameter smaller than the inside diameter of roller R thereby permitting roller R to roll with respect to bearing 60. Bearing 60 further contains a bore 64 therethrough. An end cap 66 is secured to one end of frame F and has a prong 68 extending therefrom. Prong 68 is adapted to engage bearing 60 within bore 64. Additionally, the end of round shaft 42, having longitudinal slot 46, terminates within roller R short of bearing 60.

In assembling biasing means B, washer 50 is mounted to shaft 42. Bearing 52 is mounted to shaft 42 adjacent washer 50. Spring 54 is secured to bearing 52 on one end and to longitudinal slot 46 on the opposite end. It should be noted that bearing 52 has a cylindrical bearing suface 70 adjacent to reduced diameter section 56. The reduced diameter section 70 is of a smaller diameter than the inside diameter of roller R thereby allowing easy insertion of bearing 52 into roller R.

Figure 6:
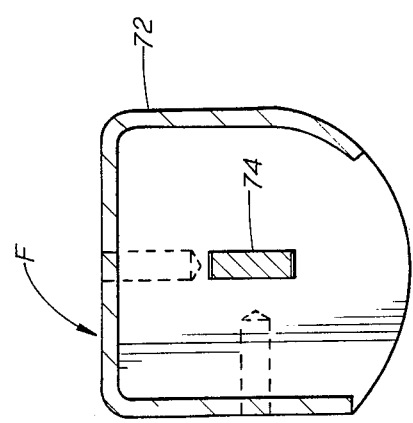
FIG. 6 is an elevational view taken along lines 6—6 of FIG. 4 of an end cap secured to the frame to support the roller assembly.

Shaft 42 is then inserted into roller R. Bearing 60 is mounted to roller R. End cap 66 is fastened to frame F so that prong 68 engages bore 64 of bearing 60. Bearing 52 is secured to roller R. Shaft 42 is rotated thereby building in a windup into spring 54. In order to retain the windup of spring 54, end cap 72 (FIG. 6), having a slot 74, thereon is secured to frame F over flat 44.

Screen S has a seam 76 stitched on one end thereof (FIG. 5). An appropriate filler material (not shown) can be optionally inserted into seam 76 whereupon screen S can be slipped through longitudinal slit 58 on roller R before assembly of biasing means B. The opposite end 78 of screen S (FIG. 8) has a stitched seam 80 thereon.

A backing member 82 is inserted into seam 80. A handle member 84 is fastened over screen material onto backing member 82. Handle member 84 has at least one opening 86 thereon.

Retaining means T comprises a pair of suction cups 88 fabricated from a suitable resilient material. Each suction sup 88 has a hook 90 connected thereto and adapted to engage opening 86 of handle member 84 when screen S is pulled over a window. When used to cover a windshield, suctions cups 88 can be secured to the windshield or the top of the dashboard on the end of the window opposite said frame F.

It can be readily seen by those skilled in the art that the apparatus of the present invention can be used on windshields of differing curvatures and can be quickly mounted or dismounted from one vehicle for use in another. The pivoting attachment of mounting members 32, facilitates a strong bond between mounting members 32 and the window W through reticulated fasteners 36 and 38. Althrough an entire windshield can be screened by use of a screen S and a frame F of the width of the entire window, it is preferred, for ease of handling, that a windshield or rear window of a vehicle be covered with a pair or three of the apparatus A with each apparatus suitable for screening a segment of the window.

The mounting arrangement facilitates the operation of the screen S. The components employed to bias roller R are of a simple and lightweight construction so as to minimize the overall weight of the apparatus A which must be supported by the interaction of reticulated fasteners 36 and 38. Furthermore, handle member 84 is of sufficient width such that when hooks 90 are disengaged from openings 86, screen S is retracted onto roller R until handle member 84 engages both roller R and frame F. As a result handle member 84 is always left in a neutral position wherein the operator can quickly grasp it with fingers inserted into opening 86.

The foregoing disclosure and description of the invention are illustrative and explanatory thereof, and various changes in the size, shape and materials, as well as in the details of the illustrated construction may be made without departing from the spirit of the invention.

We claim:

1. A lightweight sun screen to cover a window in a vehicle comprising:
   an elongated frame;
   a screen secured to said frame and selectively movable from an extended position wherein said screen covers the window and a retracted position wherein said screen is retracted from the window;
   a roller pivotally mounted to said frame;
   said screen connected to said roller;
   biasing means mounted with said roller to selectively retain said screen in said retracted position, rolled up on said roller; and
   means for mounting said frame further comprising:
   a substantially planar mounting surface on said frame;
   at least one mounting member adapted to be mounted adjacent to the window of a vehicle;
   pivot means with said mounting member and mounting surface for allowing each said mounting member to pivot about an axis in a plane substantially perpendicular to the longitudinal axis of said frame;
   said pivot means further comprises:
      a first bracket secured to said mounting surface having at least one bore thereon;
      a second bracket, secured to said mounting member, having at least one bore thereon;
      fastening means for securing said bores on said first and second brackets in alignment with each other for allowing said second bracket to pivot with respect to said first bracket;
   said mounting means allowing each said mounting member to be aligned to windows of different curvatures, whereupon the sun screen can be secured interchangeably to screen a substantially flat window and a curved window in a number of different vehicles.

2. The apparatus of claim 1 wherein said first and second brackets each further comprise:
   a substantially planar elongated segment having a first and second end;
   a substantially planar first pivot segment extending from said first end of said elongated segment in a plane perpendicular thereto, said first pivot segment having said bore thereon; and
   a substantially planar second pivot segment extending from said second end of said elongated segment and substantially parallel to said first pivot segment, said second pivot segment having said bore thereon.

3. The apparatus of claim 2 wherein:
   said elongated segment of said first bracket is connected to said mounting surface on said frame;
   said mounting member further comprises:
   a substantially flat plate;
   said elongated segment of said second bracket is connected to said substantially flat plate;
   said fastening means retaining said bores on said first pivot segments of said first and second brackets in an aligned relation;
   said fastening means retaining said bores on said second pivot segments of said first and second brackets in an aligned relation;
   whereupon said substantially flat plate can swivel into alignment with windows of varying curvatures used in different vehicles.

4. The apparatus of claim 3 wherein:
   at least two identical assemblies each comprising said first and second brackets said fastening means and said substantially flat plate are employed to secure said frame to the vehicle.

5. The apparatus of claim 4 wherein:
   each said substantially flat plate has a reticulated fastener connected thereto; and further comprising:
   a pair of reticulated fasteners connected to said vehicle to interact with said reticulated fasteners on said substantially flat plates for securing said frame to said vehicle.

6. The apparatus of claim 5 wherein said biasing means further comprises:
   a shaft having a flat at one end and a longitudinal slot at the opposite end;
   a first bearing mounted to said shaft adjacent said flat;
   a second bearing mounted to said shaft adjacent said longitudinal slot;
   an elongated spring mounted to said shaft having a first end secured to said slot and a second end secured to said first bearing.

7. The apparatus of claim 6 wherein:
   said shaft extends through said roller;
   said second bearing is supported by said frame;

said first bearing is secured to said roller and said flat is rotated thereby winding up said spring; and said flat on said shaft is fixedly held by said frame to retain said windup in said spring.

8. The apparatus of claim 7 wherein:

said roller is formed having a longitudinal slit thereon;

said screen extends through said slit on a first end for mounting to said roller.

9. The apparatus of claim 8 further including:

means for retaining the screen in said extended position against the retraction force of said spring.

10. The apparatus of claim 9 wherein said retaining means further comprises:

a handle mounted to the opposite end of said screen from said first end;

at least one resilient suction cup adapted to be mounted to the vehicle adjacent the opposite side of a window from said frame;

at least one hook connected to said suction cup and adapted to engage said handle.

11. The apparatus of claim 10 wherein said handle is adapted to be engaged between said roller and said frame when said screen is in said retracted position thereby allowing ready access to operably move said screen from said retracted to said extended position.

12. The apparatus of claim 1 wherein said biasing means further comprises:

a shaft having a flat at one end and a longitudinal slot at the opposite end;

a first bearing mounted to said shaft adjacent said flat;

a second bearing mounted to said shaft adjacent said longitudinal slot;

an elongated spring mounted to said shaft having a first end secured to said slot and a second end secured to said first bearing.

13. The apparatus of claim 12 wherein:

said shaft extends through said roller;

said second bearing is supported by said frame;

said first bearing is secured to said roller and said flat is rotated thereby winding up said spring; and said flat on said shaft is fixedly held by said frame to retain said windup in said spring.

14. The apparatus of claim 13 wherein:

said roller is formed having a longitudinal slit thereon;

said screen extends through said slit on a first end for mounting to said roller.

15. The apparatus of claim 14 further including:

means for retaining the screen in said extended position against the retraction force of said spring.

16. The apparatus of claim 15 wherein said retaining means further comprises:

a handle mounted to the opposite end of said screen from said first end;

at least one resilient suction cup adapted to be mounted to the vehicle adjacent the opposite side of a window from said frame;

at least one hook connected to said suction cup and adapted to engage said handle.

17. The apparatus of claim 16 wherein said handle is adapted to be engaged between said roller and said frame when said screen is in said retracted position thereby allowing ready access to operably move said screen from said retracted to said extended position.

18. A lightweight sun screen to cover a window in a vehicle comprising:

an elongated frame;

a screen secured to said frame and selectively movable from an extended position wherein said screen covers the window and a retracted position wherein said screen is retracted from the window;

a roller pivotally mounted to said frame;

said screen connected to said roller;

biasing means mounted with said roller to selectively retain said screen in said retracted position, rolled up on said roller; and means for mounting said frame further comprising:

mounting surface on said frame;

at least one mounting member adapted to be mounted adjacent to the window of a vehicle;

pivot means with said mounting member and mounting surface for allowing each said mounting member to pivot about an axis;

said pivot means further comprises:

a first bracket secured to said mounting surface having at least one bore thereon;

a second bracket, secured to said mounting member, having at least one bore thereon;

fastening means for securing said bores on said first and second brackets in alignment with each other for allowing said second bracket to pivot with respect to said first bracket;

said mounting means allowing each said mounting member to be aligned to windows of different curvatures, whereupon the sun screen can be secured interchangeably to screen a substantially flat window and a curved window in a number of different vehicles.

* * * * *